US010941873B2

(12) United States Patent
Emi

(10) Patent No.: US 10,941,873 B2
(45) Date of Patent: Mar. 9, 2021

(54) MOUTHPIECE

(71) Applicant: ORIGINALBOX CO., LTD., Kanagawa (JP)

(72) Inventor: Hisao Emi, Kanagawa (JP)

(73) Assignee: ORIGINALBOX CO., LTD., Kanagawa (JP)

( * ) Notice: Subject to any disclaimer, the term of this patent is extended or adjusted under 35 U.S.C. 154(b) by 68 days.

(21) Appl. No.: 16/576,575

(22) Filed: Sep. 19, 2019

(65) Prior Publication Data
US 2020/0011441 A1    Jan. 9, 2020

Related U.S. Application Data

(63) Continuation of application No. PCT/JP2018/020073, filed on May 24, 2018.

(30) Foreign Application Priority Data

Jun. 9, 2017 (JP) ............................. JP2017-113914
May 18, 2018 (JP) ............................. JP2018-095801

(51) Int. Cl.
*F16K 15/20* (2006.01)
*B60C 29/06* (2006.01)

(52) U.S. Cl.
CPC ............ *F16K 15/205* (2013.01); *B60C 29/06* (2013.01); *Y10T 137/3724* (2015.04)

(58) Field of Classification Search
CPC .......................... F04B 33/005; Y10T 137/3724
USPC .......................................................... 141/38
See application file for complete search history.

(56) References Cited

U.S. PATENT DOCUMENTS

| | | | | |
|---|---|---|---|---|
| 2,003,039 A | * | 5/1935 | Crowley | ............... B60C 29/064 |
| | | | | 285/317 |
| 4,182,370 A | * | 1/1980 | Karcher | .................. F16L 37/23 |
| | | | | 137/231 |
| 4,883,107 A | * | 11/1989 | Keys | ....................... B60C 29/06 |
| | | | | 152/431 |

(Continued)

FOREIGN PATENT DOCUMENTS

| | | |
|---|---|---|
| JP | S45-19965 Y | 8/1970 |
| JP | H1-508518 A | 7/1999 |
| JP | 6081644 B1 | 2/2017 |

OTHER PUBLICATIONS

International Search Report issued in PCT/JP2018/020073 dated Aug. 21, 2018 with English Translation (5 pages).

*Primary Examiner* — Robert K Arundale
(74) *Attorney, Agent, or Firm* — Nakanishi IP Associates, LLC

(57) ABSTRACT

A mouthpiece includes: a mouthpiece main body portion including a tubular member to which an air supply device is connected on one end side and a tire valve is connected on the other end side; an annular protruding portion which is formed at a required position on the outer circumferential portion of the mouthpiece main body portion; a tire valve insertion hole provided in a tire-valve-side tip portion of the mouthpiece main body portion; an O-ring arranged on the air supply device side inside the tire valve insertion hole; and a back-up ring that presses the O-ring from the air supply device side of the O-ring; an actuation body having a substantially convex shape in which a cylindrical tip portion is reduced in diameter.

3 Claims, 10 Drawing Sheets

(56) References Cited

U.S. PATENT DOCUMENTS

| | | | |
|---|---|---|---|
| 6,170,542 B1 * | 1/2001 | Loureiro Benimeli | ..................... B60S 5/046 141/192 |
| 2011/0123262 A1 * | 5/2011 | Huang | .................. F04B 33/005 403/299 |
| 2012/0125446 A1 * | 5/2012 | Chuang | .................. B60C 29/06 137/231 |
| 2012/0234401 A1 * | 9/2012 | Wu | ........................ F16L 37/00 137/231 |

* cited by examiner

MOUTHPIECE

CROSS-REFERENCE TO RELATED APPLICATIONS

This application is a continuation application of International Patent Application No. PCT/JP2018/20073 filed on May 24, 2018, which is based upon and claims the benefit of priority from the prior Japanese Patent Applications Nos. 2017-113914, filed Jun. 9, 2017 and 2018-0965801, filed May 18, 2018 the entire contents of which are incorporated herein by reference.

FIELD

Embodiments described herein relate generally to a mouthpiece for inflation or for measurement (hereinafter, referred to as "mouthpiece"), and more specifically relate to a mouthpiece that is used when connected to a tire valve provided in a tube or a wheel when filling compressed air into an automobile tire or when measuring the pressure of air that is filled, and in particular relate to a mouthpiece that is suitable for a racing vehicle or a component which requires precision operations such as a gas-sealed-type shock absorber.

BACKGROUND

Conventionally, in order to fill air into a region formed in an airtight state between an automobile tire and a wheel or into a tube (hereunder, referred to as "tire or the like"), a configuration is adopted in which a mouthpiece provided at the tip of an air hose that is connected to an air supply device is pushed against a tire valve provided in the wheel or tube, and compressed air is fed into the tire or the like (for example, see Japanese Utility Model Publication No. 45-19965).

Further, when measuring the pressure of compressed air that has been filled also, similarly to the situation described above, a mouthpiece provided at the tip of an air hose connected to a tire pressure gauge (measuring instrument) is pressed against the tire valve to perform measurement.

The tire valve that is provided in the wheel or tube is normally blocked by an actuation valve, and compressed air that has been filled is kept in an airtight state within the tire or the like.

On the other hand, the mouthpiece is also normally blocked by an actuation valve, and a configuration is adopted so that compressed air is filled into the tire or the like upon an actuation valve tip portion of the tire valve and an actuation valve tip portion of the mouthpiece contacting against each other so that the actuation valves open and communicate.

SUMMARY OF THE INVENTION

Technical Problem

However, when filling compressed air with the mouthpiece described in Japanese Utility Model Publication No. 45-19965 or with a mouthpiece that is conventionally used, the sequence of operations is as follows: an actuation valve tip that is built into the mouthpiece and an actuation valve tip of the tire valve contact against each other, and first the actuation valve of the tire valve opens and compressed air that is inside the tire or the like leaks out into the atmosphere, and thereafter a tire-valve-tip annular portion and packing which is arranged inside the mouthpiece contact against each other to form an airtight state between the mouthpiece and the tire or the like, and finally the actuation valve that is built into the mouthpiece opens. Thus, there has been the problem that because the operations are performed in the foregoing sequential order, compressed air that is inside a tire or the like leaks out into the atmosphere when performing the operation to fill compressed air.

In addition, there is the problem that when the mouthpiece is detached from the tire valve when the operation to fill compressed air ends, after the airtight state between the mouthpiece and the tire or the like is released, the actuation valve of the tire valve closes, and consequently a small quantity of compressed air leaks into the atmosphere. Furthermore, this problem occurs not only when filling compressed air into the tire or the like, but also similarly occurs when measuring the pressure of compressed air that has been filled, resulting in a decrease in the pressure in the tire or the like due to compressed air leaking out after measurement is performed.

Further, according to the conventional mouthpiece, the amount of compressed air that leaks out into the atmosphere depends on the speed at which a worker performs the air filling operation, and there is a tendency for the worker to be concerned about this fact and to hurriedly perform the operation. However, there is also the problem that if the air filling operation is performed hurriedly, the reliability with which the operation is performed decreases, and the tire-valve-tip annular portion and the packing arranged inside the mouthpiece do not contact against each other evenly, and as a result the airtight state is uncomplete and additional compressed air leaks out. The present invention has been made in consideration of the above described problems, and a specific object of the present invention is to provide a mouthpiece with which, by adopting a configuration such that the order of operations when mounting the mouthpiece onto a tire or the like is such that an actuation valve opens after securing an airtight state between the mouthpiece and the tire or the like, and furthermore, when detaching the mouthpiece when measurement of the pressure of compressed air that has been filled ends, an actuation valve that is built into the mouthpiece closes after the tire valve closes and thereafter the airtight state is released, there is no concern that compressed air inside the tire or the like will leak out into the atmosphere, and thus a worker can calmly and reliably perform the air filling operation, and the pressure of the compressed air does not decrease after measurement.

Solution to Problem

The present invention is devised to achieve the object. More specifically, according to the present invention, there is provided a mouthpiece comprising: a mouthpiece main body portion including a tubular member, wherein one end side of the tubular member is connected to an air supply device and the other end side thereof is connected to a tire valve; an annular protruding portion which is provided in a protruding manner at a desired position on an outer circumferential portion of the mouthpiece main body portion and that serves as a finger hook when performing an operation; a tire valve insertion hole provided in a tire-valve-side tip portion of the mouthpiece main body portion; an O-ring which is provided on an air supply device side inside the tire valve insertion hole, and which abuts on a tip annular portion of the tire valve; a back-up ring that presses the O-ring from an air supply device side of the O-ring; an actuation body having a substantially convex shape in which a cylindrical-shaped tip portion is reduced in diameter, with the tip portion being inserted through a central circle of the back-up ring, and which is capable of sliding therealong inside the mouthpiece main body portion; an opening portion that penetrates the actuation body in a direction from the air supply device side to a tire-valve-side; an opening portion that penetrates the back-up ring in a direction from the air supply device side to the tire-valve-side; a valve-opening-adjustment spring which is arranged between the actuation body and the back-up ring and which energizes the actuation body and the back-up ring in an extension direction thereof so that the back-up ring follows a movement of the tire valve; and an actuation valve which is built into the mouthpiece on the air supply device side relative to the actuation body and which has an actuation valve area that is equal to an actuation valve area of an actuation valve that is built into the tire valve. In addition, in the actuation body, in a state in which the tip annular portion of the tire valve and the O-ring do not abut on each other, the tip portion of the actuation body does not protrude to the tire valve side beyond the O-ring, the tire valve insertion hole has an inner diameter that is larger than an outer diameter of the tire valve, and the mouthpiece has a desired inner diameter and axial direction depth for guiding the tire valve to be inserted at an angle that the tire-valve-tip annular portion and the O-ring evenly abut on each other.

When filling compressed air into a tire or the like by means of the mouthpiece of the present invention, first, by inserting a tire valve from the tire valve insertion hole, the tire-valve-tip annular portion and the O-ring contact against each other to form an airtight state, and thereafter the tip portion of the actuation body contacts against an actuation valve tip that is provided inside the tire valve, and by further continuing insertion of the tire valve, the actuation body slides in the axial direction and contacts against the actuation valve which is built into the mouthpiece, and thereafter the respective actuation valves open and compressed air is filled into the tire or the like. According to the mouthpiece of the present invention, compressed air from a tire or the like does not leak into the atmosphere when attaching or detaching the mouthpiece to or from a tire valve, and furthermore, because the amount of compressed air that leaks out into the atmosphere is not dependent on the speed of the operation unlike a conventional mouthpiece, a worker can calmly and reliably perform an air filling operation. Further, by adjusting the spring constant of the valve-opening-adjustment spring, the valve-opening timings of the actuation valve on the tire valve side and the actuation valve that is built into the mouthpiece can be adjusted.

Further, when filling compressed air into a tire or the like by means of the mouthpiece of the present invention, as described above, the tire valve insertion hole serves as a guide for insertion of a tire valve, and a tire-valve-tip annular portion and the O-ring contact against each other substantially evenly, and there is thus the effect that it is easy to place the tire valve and the mouthpiece in an airtight state.

A configuration in which a spring constant of the valve-opening-adjustment spring is equal to or greater than 3 N/mm and is equal to or less than 20 N/mm is included in the present invention.

If the spring constant of the valve-opening-adjustment spring of the present invention is set in a range of 3 N/mm to 20 N/mm, when measuring the pressure of compressed air which is filled, the sequence of operations is as follows: the tire-valve-tip annular portion and the O-ring contact against each other to form an airtight state, and thereafter a restoring force of the valve-opening-adjustment spring is also applied and the actuation body slidingly retreats in the axial direction to thereby contact against the actuation valve that is built into the mouthpiece to open the actuation valve, and thereafter the tip portion of the actuation body presses and opens the actuation valve tip that is arranged inside the tire valve. On the other hand, when detaching the mouthpiece, the sequence of operations is the reverse of the aforementioned sequence, namely, the actuation valve on the tire valve initially closes so that there is no leakage of compressed air, and there is thus no concern that the air pressure will decrease after measurement, and the air pressure value that is the measurement result can be maintained.

A configuration in which an inner diameter of the O-ring is in a range of 5.0 mm to 7.5 mm and a wire diameter of the O-ring is in a range of 1.7 mm to 2.0 mm is included in the present invention.

If an O-ring having an inner diameter in a range of 5.0 mm to 7.5 mm and a wire diameter in a range of 1.7 mm to 2.0 mm is used as the O-ring of the present invention, after the tire valve is inserted from the tire valve insertion hole to cause the tire-valve-tip annular portion and the O-ring to contact against each other to form an airtight state between the mouthpiece and the tire valve, if the tire valve is pressed further, while maintaining the airtight state between the tire valve and the mouthpiece, the O-ring slides back along an inner wall of an expanded-diameter portion of the mouthpiece, and when the actuation valve that is built into the mouthpiece opens thereafter, pressure is applied to the O-ring by compressed air and the O-ring is pressed further in the radial direction, and an effect is thus achieved of further increasing the airtight state between the mouthpiece and the tire valve.

Advantageous Effect of Invention

When filling compressed air into a tire or the like by means of the mouthpiece of the present invention, because a configuration is adopted in which the sequence of operations is such that an actuation valve that is built into a tire valve opens after the tire valve and the mouthpiece are placed in an airtight state, compressed air does not leak out into the atmosphere when attaching or detaching the mouthpiece, and the amount of compressed air that leaks out into the atmosphere is not dependent on the speed of the operation, and therefore a worker can calmly and reliably perform the operation of filling compressed air. Further, when detaching the mouthpiece of the present invention after measurement of compressed air by means of the mouthpiece has finished, because the actuation valve on the tire valve side closes first, there is no leakage of compressed air, and consequently there is the advantage that there is no concern that the air pressure will decrease after measurement and the air pressure value that is the measurement result can be maintained.

BRIEF DESCRIPTION OF THE VIEWS OF THE DRAWING

FIG. 4 is an enlarged cross-sectional view showing compressed air of the mouthpiece illustrated in FIG. 1 being filled into a tire or the like;

FIG. 7 is an enlarged cross-sectional view showing compressed air of the mouthpiece illustrated in FIG. 5 being filled into a tire or the like;

DETAILED DESCRIPTION

The embodiments of the present invention will be described below referring to the accompanying drawings.

First Embodiment

Figure 1:
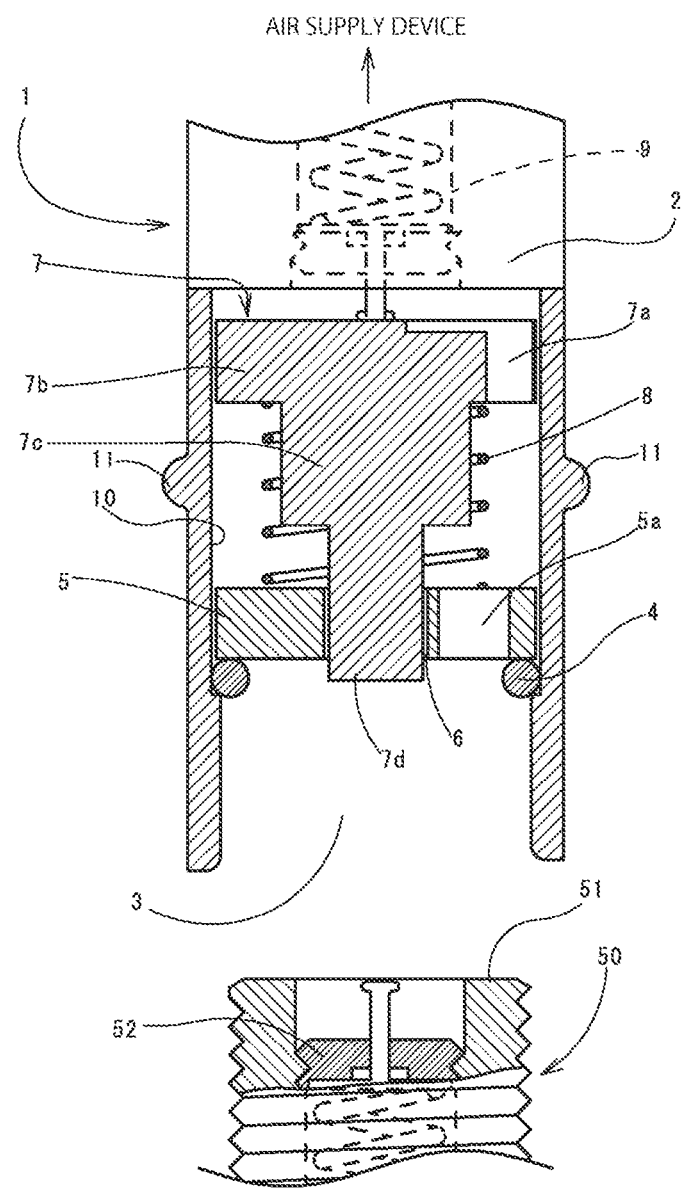
FIG. 1 is an enlarged cross-sectional view illustrating a mouthpiece according to the present invention.

In a mouthpiece 1 according to the present embodiment illustrated in FIG. 1, a mouthpiece main body portion 2 is formed of a tubular member, wherein an air supply device (not illustrated in the drawing) is connected to one end side of the tubular member and a tire valve 50 is connected to the other end side thereof.

An annular protruding portion 11 is formed at a desired position on the outer circumferential portion of the mouthpiece main body portion 2, and a tire valve insertion hole 3 is provided at the tip portion on the tire valve side in an open state. In addition, an O-ring 4 that abuts on a tire-valve-tip annular portion 51 is internally arranged in an expanded-diameter portion 10 which is provided on the air supply device side of the tire valve insertion hole 3 and which is expanded in diameter relative to the tire valve insertion hole 3.

Further, on the air supply device side of the O-ring 4 are arranged a back-up ring 5 that presses the O-ring 4, and an actuation body 7 that is formed in a substantially convex shape and that is inserted through a central circle 6 of the back-up ring 5. In addition, a valve-opening-adjustment spring 8 that presses the back-up ring 5 is arranged between the back-up ring 5 and the actuation body 7. On the other hand, on the air supply device side of the actuation body 7, an actuation valve 9 for maintaining airtightness of the air supply device is built thereinto.

The back-up ring 5 is formed in a substantially annular shape in a plan view, and a dimension of the outer diameter thereof is set to a desired dimension that is smaller than the inner diameter of the expanded-diameter portion 10 and larger than the inner diameter of the O-ring 4. Further, in an annular flange portion, a cylindrical-shaped opening portion 5a is formed as a passage for compressed air.

The actuation body 7 is partially reduced in diameter from the cylindrical tip portion such that the actuation body 7 is formed in a substantially convex shape in a side view, wherein a portion that is not reduced in diameter being taken as an actuation body bottom portion 7b, and an actuation body trunk portion 7c being formed at a reduced-diameter portion, and furthermore, the diameter of a tip portion of the actuation body trunk portion 7c being reduced to form an actuation body tip portion 7d.

Further, in the actuation body bottom portion 7b, as a passage for compressed air between the expanded-diameter portion 10 and the actuation valve 9, an opening portion 7a is formed, wherein cylinders having different diameters lie one upon another in the axial direction to be communicated with each other with a portion of the circumferential portion of each cylinder being aligned. On the other hand, a dimension of the outer diameter of the actuation body bottom portion 7b is formed to be smaller than the inner diameter of the expanded-diameter portion 10, the actuation body trunk portion 7c is formed to be smaller than the inner diameter of the valve-opening-adjustment spring 8, and furthermore, the outer diameter of the actuation body tip portion 7d is formed to be smaller than the inner diameter of the central circle 6.

A footprint of the actuation valve 9 that is built thereinto on the air supply device side is set to be approximately equal to that of a tire-side actuation valve 52.

Figure 2:
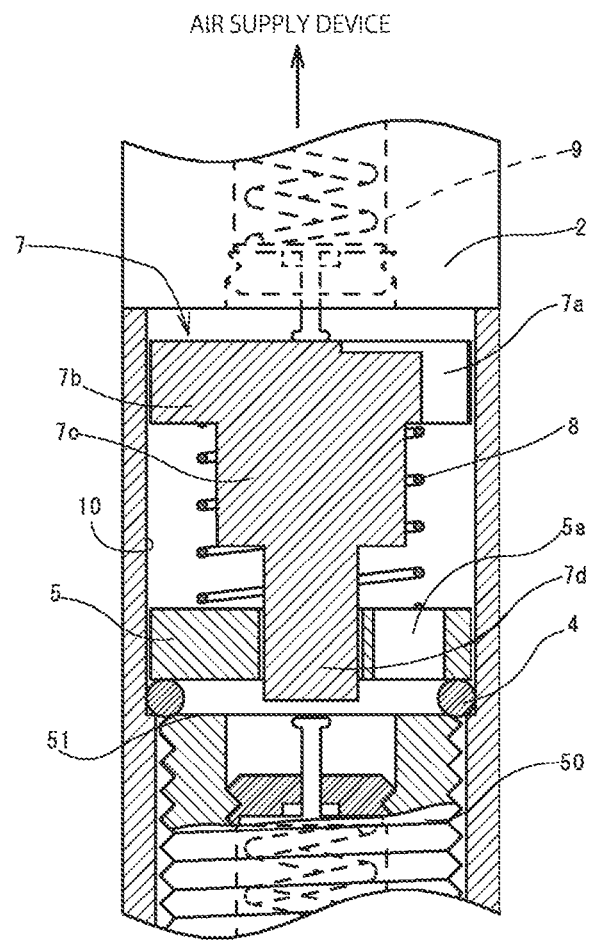
FIG. 2 is an enlarged cross-sectional view illustrating an airtight state of the mouthpiece and a tire valve illustrated in FIG. 1.

In order to fill compressed air into a tire or the like by means of the mouthpiece 1 according to the present invention, first, as illustrated in FIG. 2, the tire valve 50 is inserted into the tire valve insertion hole 3 to cause the tire-valve-tip annular portion 51 to evenly abut on the O-ring 4 thereby creating an airtight state.

Figure 3:
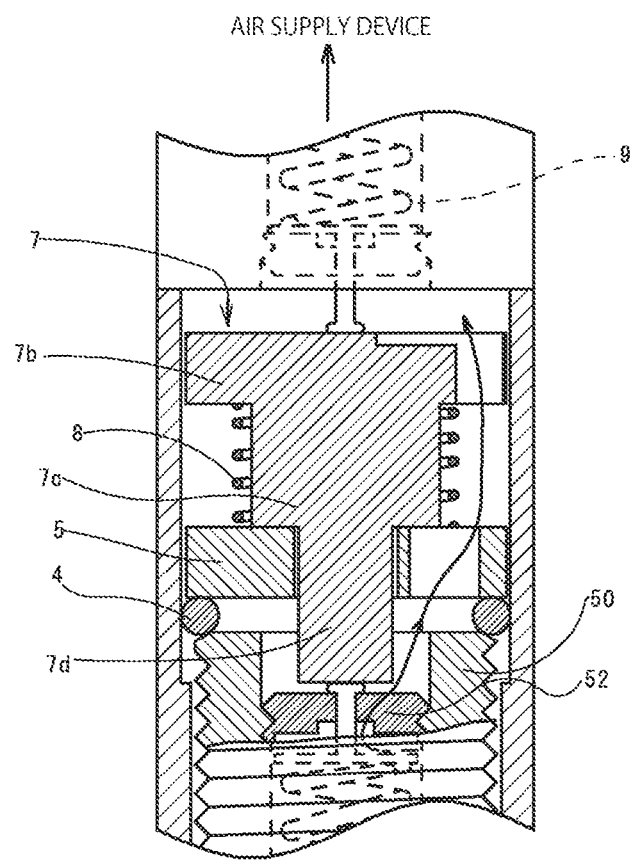
FIG. 3 is an enlarged cross-sectional view illustrating an open state of the tire valve illustrated in FIG. 1.

In FIG. 3, the tire valve 50 is further inserted, wherein the O-ring 4 and the back-up ring 5 retreat toward the air supply device side to cause the back-up ring 5 to abut on the actuation body trunk portion 7c. On the other hand, the actuation body tip portion 7d opens the tire-side actuation valve 52 that is built into the tire valve, thereby causing the inside of the tire or the like and the mouthpiece 1 to be communicated with each other.

Figure 4:
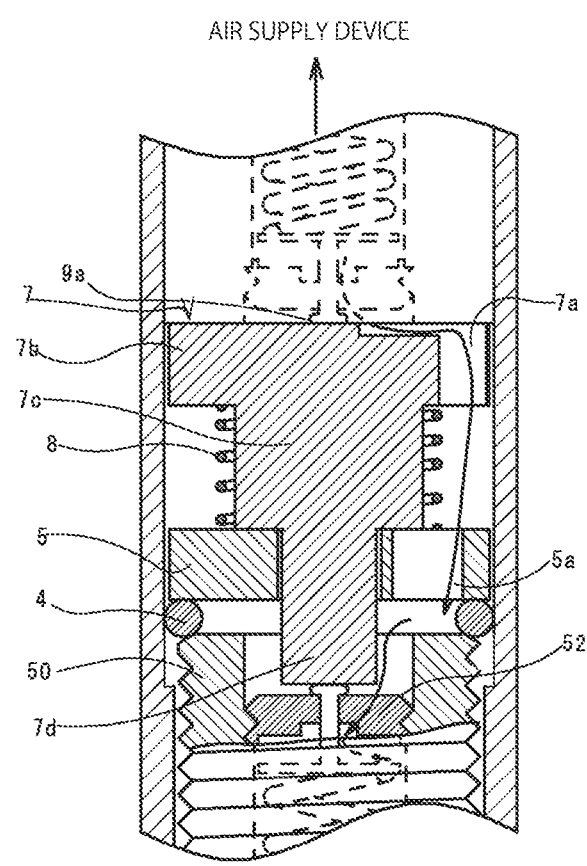

In addition, when the tire valve 50 is inserted, as illustrated in FIG. 4, the O-ring 4, the back-up ring 5 and the actuation body 7 retreat toward the air supply device side and the actuation body bottom portion 7b presses an actuation valve tip portion 9a, thereby opening the actuation valve 9, so that the inside of the tire or the like and the air supply device communicate with each other and compressed air is filled thereinto.

At this time, the O-ring 4 slides along the inner wall of the expanded-diameter portion 10, thereby keeping maintaining the airtight state between the tire valve 50 and the mouthpiece 1.

As to the sequence of a series of the operations mentioned above, in the case of general cars, the actuation valve 52 on the tire side shall be first opened as described above since the pressurization value of compressed air is usually set to the range of around 7 kgf/cm$^2$ to 8 kgf/cm$^2$ on the air supply device side, whereas that on the tire side is usually set to the range of around 2 kgf/cm$^2$ to 3 kgf/cm$^2$. However, the order of opening the valves can be adjusted by selectively changing the spring constant of the valve-opening-adjustment spring 8 as needed.

The mouthpiece 1 according to the present invention can be formed by using steel or stainless steel, brass, carbon steel or the like as a material. Further, the protruding portion 11 can be integrally formed with the mouthpiece 1 using the same material as that of the mouthpiece 1, or may be formed using a material such as synthetic resin or elastomer and fitted onto the mouthpiece 1. In addition, the mouthpiece main body portion 2 can be of a screwed disassembly-type between the actuation body 7 and the actuation valve 9, and in such a case, the actuation body 7, the valve-opening-adjustment spring 8, the back-up ring 5 and the O-ring 4 will be detachable.

As described above, the mouthpiece of the present embodiment is advantageous in that since it is configured such that the actuation valve that is built into the tire valve is opened after the tire or the like and the mouthpiece are placed in an airtight state, compressed air does not leak out into the atmosphere, and furthermore, the amount of compressed air that leaks out into the atmosphere does not depend on the operation speed, so that an operator can calmly and surely perform the operation.

Second Embodiment

Figure 8:
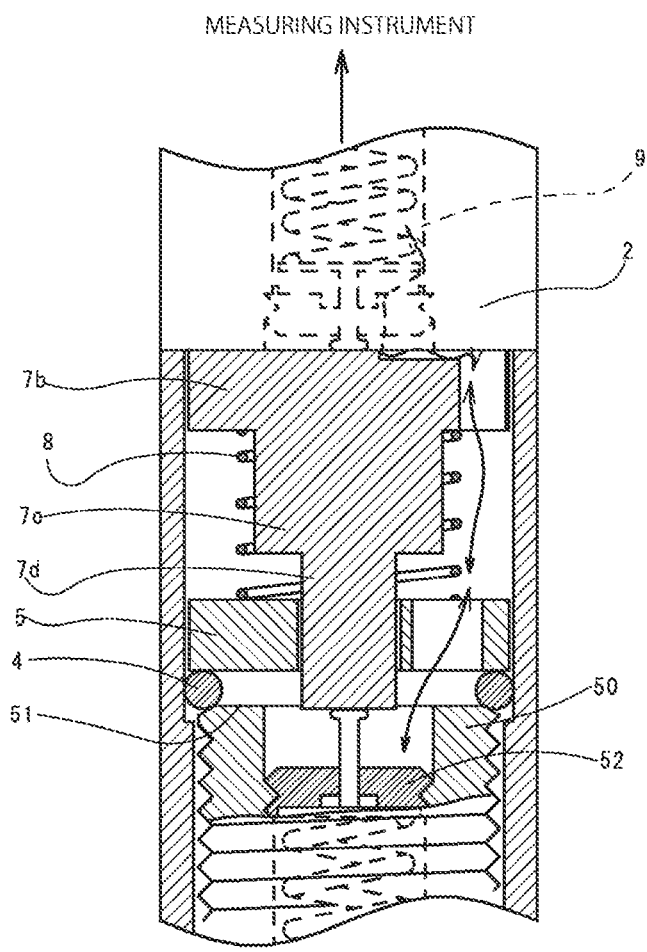
FIG. 8 is an enlarged cross-sectional view illustrating a second embodiment of the mouthpiece according to the present invention.

As illustrated in FIG. 8, in the mouthpiece 1 according to the present embodiment, a measuring instrument (not illustrated in the drawing) is connected on one end side, and the tire valve 50 is connected on the other end side.

Since the configuration of and method for manufacturing the mouthpiece 1 are the same as those in the first embodiment, a method for using the mouthpiece 1 and the sequence of operations, etc. will be described below.

In order to measure compressed air inside a tire or the like by means of the mouthpiece 1 according to the present invention, first, as illustrated in FIG. 8, the tire valve 50 is inserted into the tire valve insertion hole 3 to cause the tire-valve-tip annular portion 51 to evenly abut on the O-ring 4 thereby creating an airtight state.

When the tire valve 50 is further inserted, the O-ring 4 and the back-up ring 5 retreat toward the measuring instrument side, and the actuation body bottom portion 7b, together with the restoring force of the valve-opening-adjustment spring 8, opens the actuation valve 9 that is built into the mouthpiece 1, thereby causing the measuring instrument and the mouthpiece 1 to communicate with each other.

Figure 9:
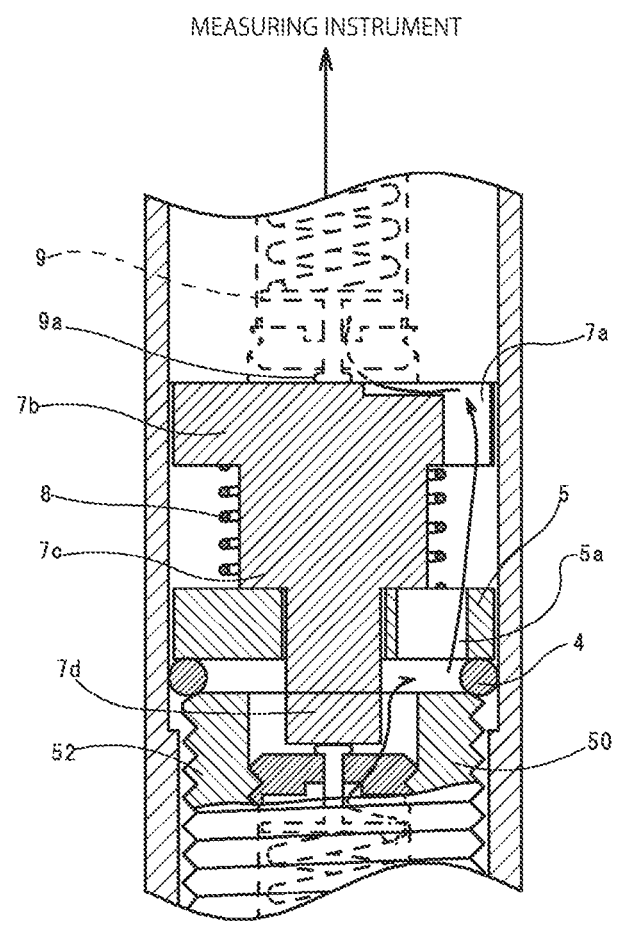
FIG. 9 is an enlarged cross-sectional view showing compressed air of the mouthpiece illustrated in FIG. 8 being measured.

Thereafter, when the tire valve 50 is further inserted, as illustrated in FIG. 9, while the O-ring 4 and the back-up ring 5 retreat toward the measuring instrument side and the back-up ring 5 abuts on the actuation body trunk portion 7c, the actuation body tip portion 7d opens the tire-side actuation valve 52 that is built into the tire valve, thereby causing the tire or the like and the mouthpiece 1 to communicate with each other and enabling measurement.

At this time, the air on the tire side is compressed and pressurized usually to a range of around 2 kgf/cm$^2$ to 3 kgf/cm$^2$, whereas the measuring instrument side is not pressurized, so the actuation valve 9 on the measuring instrument side shall first open as described above, and after measurement, the tire-side actuation valve 52 shall first close with the help of a repulsive force of the valve-opening-adjustment spring 8 as well.

As described above, since the mouthpiece of the present embodiment is configured such that the actuation valve that is built into the tire valve opens after the tire or the like and the mouthpiece are placed in an airtight state, compressed air does not leak out into the atmosphere. In particular, when detaching the mouthpiece, first, the actuation valve that is built into the tire valve closes, and thereafter the airtight state is released, and consequently there is no leakage of the compressed air that is measured, and there is also no concern that the air pressure will decrease after measurement, and the air pressure value that is the measurement result can be maintained.

Examples

Although an example of the present invention will be described below, the present invention is not limited to the following example and an appropriate variation thereof can be implemented within the scope and spirit of the invention.

Figure 10:
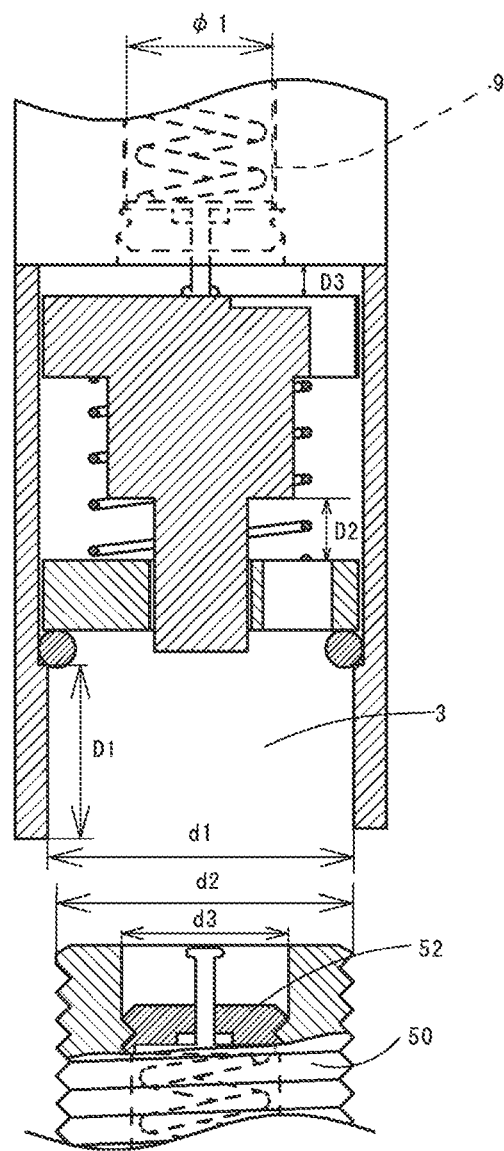
FIG. 10 is an enlarged cross-sectional view illustrating an example of the mouthpiece according to the present invention.

FIG. 10 is a view illustrating a specific example of the mouthpiece of the present invention. First, an inner diameter d1 of the tire valve insertion hole 3 may be generally set to be approximately 0.2 mm larger than an outer diameter d2 of the tire valve 50 that is used. Here, the tire valve 50 that is used in the present example is a so-called "American-type valve", wherein while the outer diameter is formed of a male screw thread which conforms to JIS standard D4207 and has a nominal size of 8V1 and the maximum value of the outer diameter d2 is defined as 7.747 mm, the inner diameter is formed of a female screw thread having a nominal size of 5V1 and the minimum value of an inner diameter d3 is defined as 5.334 mm.

Therefore, it is preferable to set the inner diameter d1 of the tire valve insertion hole 3 within a range of approximately 7.75 mm to 7.95 mm.

It is preferable to set the inner diameter of the O-ring 4 within a range of 5.0 mm to 7.5 mm, and in the present example an O-ring 4 with an inner diameter of 5.6 mm is selected. Further, it is preferable to set the wire diameter of the O-ring 4 within a range of 1.7 mm to 2.0 mm, and in the present example an O-ring 4 with a wire diameter of 1.8 mm is used.

The spring constant of the valve-opening-adjustment spring 8 may preferably selected from a range of 3 N/mm to 20 N/mm in consideration of the fact that the numerical value of compressed air used in an ordinary tire is around 2 kgf/cm$^2$ to 3 kgf/cm$^2$, and also in consideration of a pressing force required during operations, and in the present example the valve-opening-adjustment spring 8 that has a spring constant of 6 N/mm is used.

Further, it is necessary that a length obtained by adding a stroke amount D2 between the actuation body 7 and the back-up ring 5, and a sliding amount D3 of the actuation body 7 to a depth D1 of the tire valve insertion hole 3 is set so as to be shorter than the overall length of a valve stem (not illustrated in the drawing) of the tire valve 50.

The length of the valve stem of the tire valve 50 that is used in the present example is approximately 20 mm, and the depth D1 of the tire valve insertion hole 3 in the present example is set to approximately 5 to 7 mm.

Figure 5:
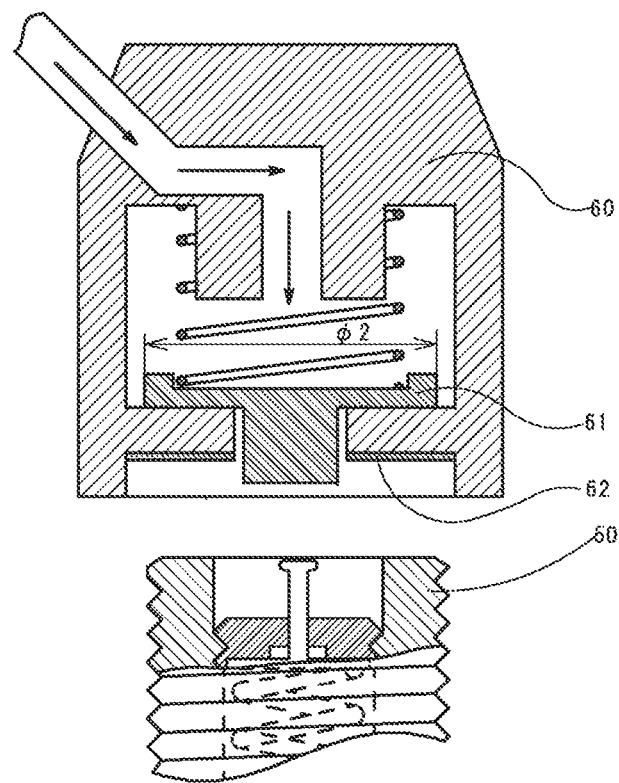
FIG. 5 is an enlarged cross-sectional view illustrating a conventional mouthpiece.
Figure 6:
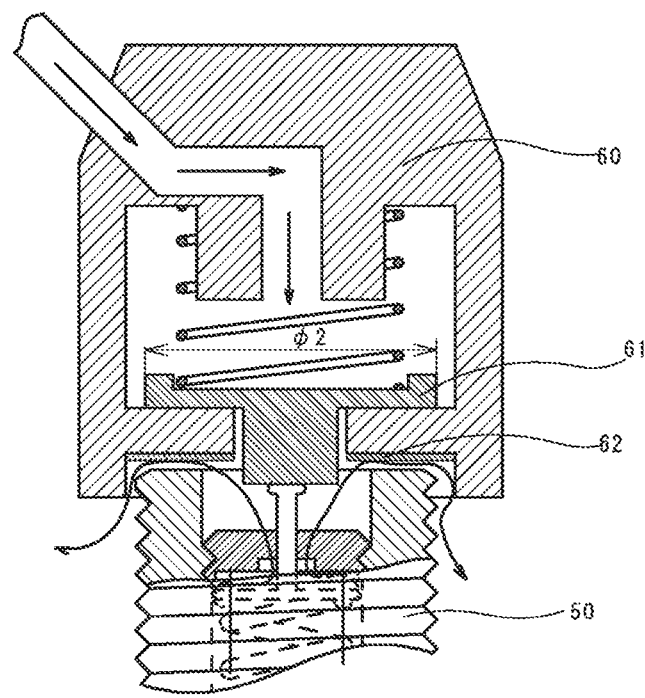
FIG. 6 is an enlarged cross-sectional view showing compressed air of the mouthpiece illustrated in FIG. 5 leaking out.
Figure 7:
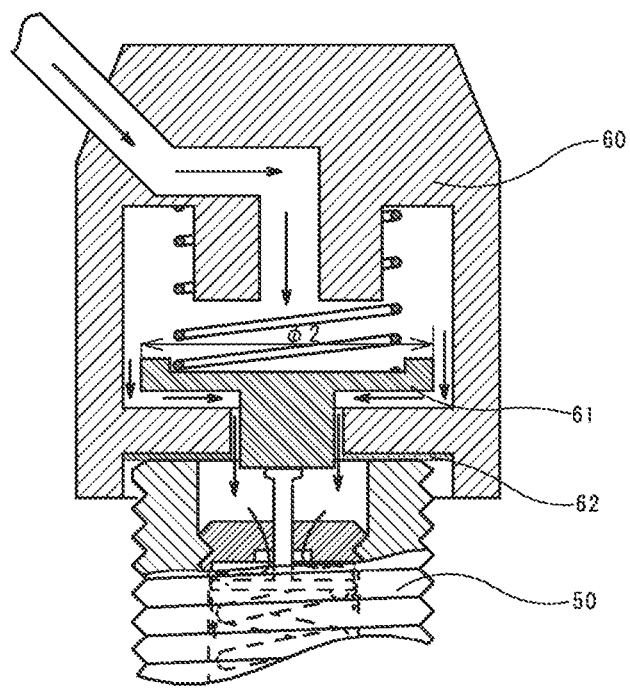

In addition, the actuation valve 9 that is used is of the same kind as the tire-side actuation valve 52, and an actuation valve diameter Φ1 thereof is approximately Φ2.3 mm. On the other hand, in many cases an actuation valve diameter Φ2 of a conventional product that is shown in FIG. 5 is normally set within the range of Φ4.5 mm to Φ5.0 mm, and therefore in the mouthpiece of the present example the pressing force that is required in order for the actuation valve to open is approximately one-third of the pressing force required in the case of the conventional product.

As described above, in the mouthpiece of the present example, the tire valve insertion hole serves as a guide for tire valve insertion, and the tire valve is inserted approximately in parallel with the tire valve insertion hole. Therefore, the tire-valve-tip annular portion and O-ring contact against each other substantially evenly, and it is easy to place the tire valve and the mouthpiece in an airtight state, and furthermore, when the actuation valve opens, the O-ring is pressurized with compressed air and is pressed in the radial direction, and thus there is an effect that the airtight state between the mouthpiece and tire valve is further enhanced.

In addition, since the actuation valve diameter is set to a smaller diameter than in the conventional product, there is an effect that the pressing force required to open the actuation valve is lighter than in the conventional product.

According to the mouthpiece of the present invention, when detaching the mouthpiece after measurement of compressed air ends, because the actuation valve on the tire valve side closes first, there is no leakage of compressed air, and the air pressure after measurement does not decrease, and the air pressure value that is the measurement result can be maintained. Furthermore, because compressed air remains on the measuring-instrument-main-body side, the amount of compressed air that flows out to the measuring instrument side the next time that compressed air of a tire is measured decreases, and thus a decrease in the pressure of compressed air inside a tire each time measurement is performed can be prevented even if measurement is repeatedly performed.

In addition, by measuring a demonstration tire in advance, an effect is also obtained whereby, by pressurizing the measuring instrument main body it is possible to prevent compressed air that is inside a tire or the like flowing out into the measuring instrument main body from the first measurement.

According to the mouthpiece of the present application, since the aforementioned effects are obtained by merely performing an operation to push the mouthpiece straight toward a tire valve, the mouthpiece is also optimally suited for precision operations such as measuring the internal pressure of a tire of a race car or adjusting the gas pressure of a gas pressure shock absorber having a gas-sealed container with a small inner capacity.

Although the best configuration and method or the like for implementing the present invention have been disclosed in the foregoing description, the present invention is not limited thereto.

For example, although in the foregoing embodiments the mouthpiece main body portion 2 is a cylindrical shape, the mouthpiece main body portion 2 is not limited to a cylindrical shape, and a part thereof may bend, and furthermore, a configuration may be adopted in which the angle of the mouthpiece can be changed by employing a movable configuration.

Furthermore, although in the foregoing embodiments it is described that the mouthpiece 1 is formed of a material such as steel, stainless steel, brass or carbon steel, the material of the mouthpiece of the present invention is not limited to those materials, and for example an aluminum alloy or a synthetic resin such as engineering plastic may be used as the material.

REFERENCE SIGNS LIST

1 Mouthpiece
2 Mouthpiece main body portion
3 Tire valve insertion hole
4 O-ring
5 Back-up ring
5a Opening portion
6 Central circle
7 Actuation body
7a Opening portion
7b Actuation body bottom portion
7c Actuation body trunk portion
7d Actuation body tip portion
8 Valve-opening-adjustment spring
9 Actuation valve
9a Actuation valve tip portion
10 Expanded-diameter portion
11 Protruding portion
50 Tire valve
51 Tire-valve-tip annular portion
52 Tire-side actuation valve
60 Conventional mouthpiece
61 Conventional actuation valve
62 Conventional packing
d1 Inner diameter
d2 Outer diameter
D1 Depth
D2 Amount of stroke
D3 Amount of movement
Φ1 Diameter of actuation valve
Φ2 Diameter of conventional actuation valve

The invention claimed is:

1. A mouthpiece, comprising:
   a mouthpiece main body portion including a tubular member, wherein one end side of the tubular member is connected to an air supply device and the other end side thereof is connected to a tip annular portion of a tire valve;
   a tire valve insertion hole provided in a tire-valve-side tip portion of the other end side of the mouthpiece main body portion;
   an O-ring which is internally arranged on an air supply device side of the tire valve insertion hole and which abuts on the tip annular portion of the tire valve;
   a back-up ring that presses the O-ring from an air supply device side of the O-ring;
   an actuation body which has a substantially cylindrical-shaped body bottom portion, a cylindrical-shaped body trunk portion having a smaller diameter than the body bottom portion, and a cylindrical-shaped tip portion having a smaller diameter than the cylindrical-shaped body trunk portion, so that the cylindrical-shaped tip portion is inserted into a central port of the back-up ring and which is capable of sliding along and inside the mouthpiece main body portion;
   an opening portion that passes through the body bottom portion in a direction from the air supply device side to a tire-valve-side thereof;
   an opening portion that passes through the back-up ring in a direction from an air supply device side to a tire-valve side;
   a valve-opening-adjustment spring which is arranged between the actuation body and the back-up ring and which biases the actuation body and the back-up ring in an extension direction thereof; and
   an actuation valve which is built thereinto on the air supply device side relative to the actuation body and which has an actuation valve area that is equal to an actuation valve area of an actuation valve that is built into the tire valve;
   wherein:
   when the O-ring does not abut on the tip annular portion of the tire valve, the tip portion of the actuation body does not protrude to the tire valve side beyond the O-ring;
   the tire valve insertion hole has an inner diameter that is larger than an outer diameter of the tire valve; and
   the mouthpiece has a inner diameter and axial direction depth for guiding the tire valve to be inserted at an angle that the tire-valve-tip annular portion and the O-ring evenly abut on each other.

2. The mouthpiece according to claim 1, wherein a spring constant of the valve-opening-adjustment spring is equal to or greater than 3 N/mm and is equal to or less than 20 N/mm.

3. The mouthpiece according to claim 1, wherein an inner diameter of the O-ring is equal to or greater than 5.0 mm and is equal to or less than 7.5 mm, and a wire diameter of the O-ring is equal to or greater that 1.7 mm and is equal to or less than 2.0 mm.

\* \* \* \* \*